United States Patent

Kobayashi et al.

[11] Patent Number: 5,604,557
[45] Date of Patent: Feb. 18, 1997

[54] CAMERA

[75] Inventors: Yoshito Kobayashi; Yu Sato, both of Hachioji, Japan

[73] Assignee: Olympus Optical Co., Ltd., Tokyo, Japan

[21] Appl. No.: 339,569

[22] Filed: Nov. 15, 1994

[30] Foreign Application Priority Data

Nov. 18, 1993 [JP] Japan ................................. 5-289345

[51] Int. Cl.$^6$ ..................................................... G03B 17/02
[52] U.S. Cl. ............................................ 396/538; 396/516
[58] Field of Search ........................................ 354/288, 212

[56] References Cited

U.S. PATENT DOCUMENTS

| | | | |
|---|---|---|---|
| 4,860,041 | 8/1989 | Harvey | 354/212 |
| 5,317,356 | 5/1994 | Dassero | 354/288 |

FOREIGN PATENT DOCUMENTS 4-67025  3/1992  Japan .

Primary Examiner—Safet Metjahic
Assistant Examiner—John Chizmar
Attorney, Agent, or Firm—Louis Weinstein

[57] ABSTRACT

A camera comprises a cartridge chamber having an access opening through which a film cartridge of film feeding type is loaded into a cavity of the cartridge chamber in a direction substantially vertical to a cartridge shaft of the film cartridge, and a slide cover capable of turning to an open position where the film cartridge is loaded and a closed position where the access opening of the cartridge chamber is closed. A turning position of the slide cover is restricted so that communication between the cavity of the cartridge chamber and a film feed passage is blocked by part of the slide cover, when the slide cover is turned to the open position.

24 Claims, 6 Drawing Sheets

CAMERA

BACKGROUND OF THE INVENTION

1. Field of the Invention

The present invention relates to a camera, and more particularly to a camera in which a film cartridge (Patrone) of film feeding type is loaded into a cartridge chamber in a direction substantially vertical to a cartridge shaft of the film cartridge.

2. Related Background Art

In cameras of backlid opening type, as is well known, when a backlid provided on the rear side of a camera body is opened, a cartridge chamber for receiving a film cartridge, a spool chamber including a spool shaft around which an exposed film is rolled up, an aperture disposed between the cartridge chamber and the spool chamber, a film feed passage provided behind the aperture to guide the film moved along it, etc. are all exposed for easy access. That type of camera has the characteristic that foreign matters such as dust are apt to enter the camera body from the exterior, while it is also relatively easy to remove the dust or the like once en feted.

On the other hand, there have recently been developed cameras in which a film cartridge of film feeding type, i.e., a film cartridge with the tip end of a film retracted into the cartridge, is loaded into a cartridge chamber, and a cartridge shaft of the film cartridge is rotated to feed the film outwardly from the interior of the cartridge to the backside of an aperture. In this type of camera, when loading the film cartridge into the cartridge chamber, the film tip end is not required to be drawn beforehand up to the spool shaft in the spool chamber of the camera unlike the above-mentioned conventional camera. Rather than providing a camera body with a backlid that opens as in the conventional camera, therefore, an access opening is formed in part of the camera body to be communicated with (i.e. opens into) a cavity of the cartridge chamber so that only the access opening and hence the cavity are exposed to the exterior when it is not closed. The film is fed through a vertically elongated slit formed in an inner peripheral wall of the cartridge chamber. The film cartridge of film feeding type is loaded into the cartridge chamber through the access opening by aligning the film cartridge, so that the cartridge is substantially aligned with a longitudinal direction of the cartridge chamber and moving the film cartridge in a direction perpendicular to the longitudinal axis of the cartridge shaft of the film cartridge.

A camera disclosed in Japanese Laid-open Patent Application No. 67025 of 1992, for example, is constructed as follows. For loading or unloading a film cartridge into or from the camera, a small openable/closable lid is disposed in the rear side of the cartridge chamber of the camera so as to selectively open or close only the access opening of the cartridge chamber. The film cartridge is loaded into or unloaded from the cartridge chamber through the access opening which is held open by approximate movement of the openable/closable lid. A vertically elongate slit is formed as part of a film feed passage in an inner peripheral wall of the cartridge chamber, and a film is fed through the slit to an aperture and then to a spool shaft disposed in a spool chamber. Further, in order that dust or the like will not enter the aperture and the spool chamber through the film feed passage when the openable/closable lid is open, an openable/closable gate for selectively allowing or blocking the communication between the film feed passage and the cartridge chamber is disposed to operate in interlocking relationship with the movement of the openable/closable lid. Accordingly, dust or the like can be prevented from entering the interior of the camera other than the cartridge chamber.

However, because the means for preventing intrusion of dust or the like, disclosed in Japanese Laid-open Patent Application No. 67025 of 1992, comprises the openable/closable gate which is operated to open or close the slit formed in the inner peripheral wall of the cartridge chamber, a complex mechanism is required to operate the openable/closable gate in interlocking relationship with opening and closing of the cartridge chamber lid or loading and unloading of the film cartridge. This results in a disadvantage of increasing the number of parts and pushing up the cost.

SUMMARY OF THE INVENTION

A first object of the present invention is to provide a camera in which a slide cover capable of performing a turning movement to assume one of open position where a film cartridge is loaded and a closed position where an access opening of a cartridge chamber is closed, the amount of turning of the slide cover being restricted by restriction means so that communication between a cavity of the cartridge chamber and a film feed passage is blocked by part of the slide cover, whereby foreign matter such as dust is prevented from entering the interior of a camera body without the need for a complex mechanism to achieve this objective.

A second object of the present invention is to provide a camera in which opening/closing means for selectively opening or closing an access opening of a cartridge chamber is arranged so as to block communication between a cavity of the cartridge chamber and a film feed passage, whereby foreign matter such as dust are prevented from entering the interior of a camera body without the need for a complex mechanism to achieve this objective.

In summary, the present invention provides a camera in which a film cartridge of film feeding type is loaded into a cartridge chamber by moving the film cartridge in a direction which is substantially perpendicular to a cartridge shaft of the film cartridge, the cartridge shaft being aligned with a longitudinal direction of the cartridge chamber wherein the camera comprises opening/closing means comprised of either a single slidable member or a plurality of slidable members and making for selectively opening or closing an access opening of the cartridge chamber, and a storage space for receiving part or all of said opening/closing means to be located in a camera body when the opening/closing means is moved to a position where the access opening of the cartridge chamber is open, whereby communication between the cartridge chamber and a film feed passage is blocked by a portion of the opening/closing means when the opening/closing means is moved to the position where the access opening of the cartridge chamber is opened.

The above and other objects and advantages of the present invention will be more clearly understood from the following detailed description.

According to the present invention, since a slit communicating the cartridge chamber and the film feed passage with each other (i.e. providing a passageway between the cartridge chamber and the film feed passage) is blocked by part of the slide cover, there is provided a camera which can prevent foreign matter such as dust from entering the interior of the camera body, such as the film feed passage and a spool chamber, with a simple structure and without increasing the number of parts to achieve the desired result.

DETAILED DESCRIPTION OF PREFERRED EMBODIMENTS

FIGS. 1 to 7 show a first embodiment of the present invention.

Figure 2:
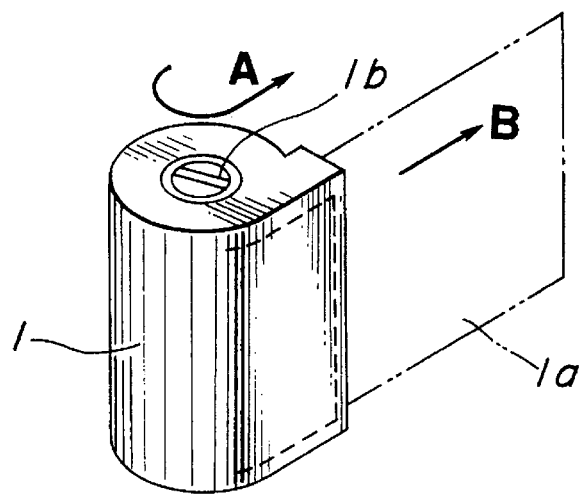
FIG. 2 is a perspective view of a film cartridge of film feeding type.

As shown in FIG. 2, a film cartridge 1 of the type employed in a camera of the present invention comprises a cylindrical case. The film cartridge 1 contains a film 1a which has a tailing end fixed to a cartridge shaft 1b rotatably supported at the center of the film cartridge, and which is wound around the cartridge shaft 1b in roll form. When the cartridge shaft 1b is rotated in the counterclockwise direction (indicated by the arrow A) in FIG. 2, the film 1a is fed out of the cartridge in a direction indicated by the arrow B.

Figure 1:
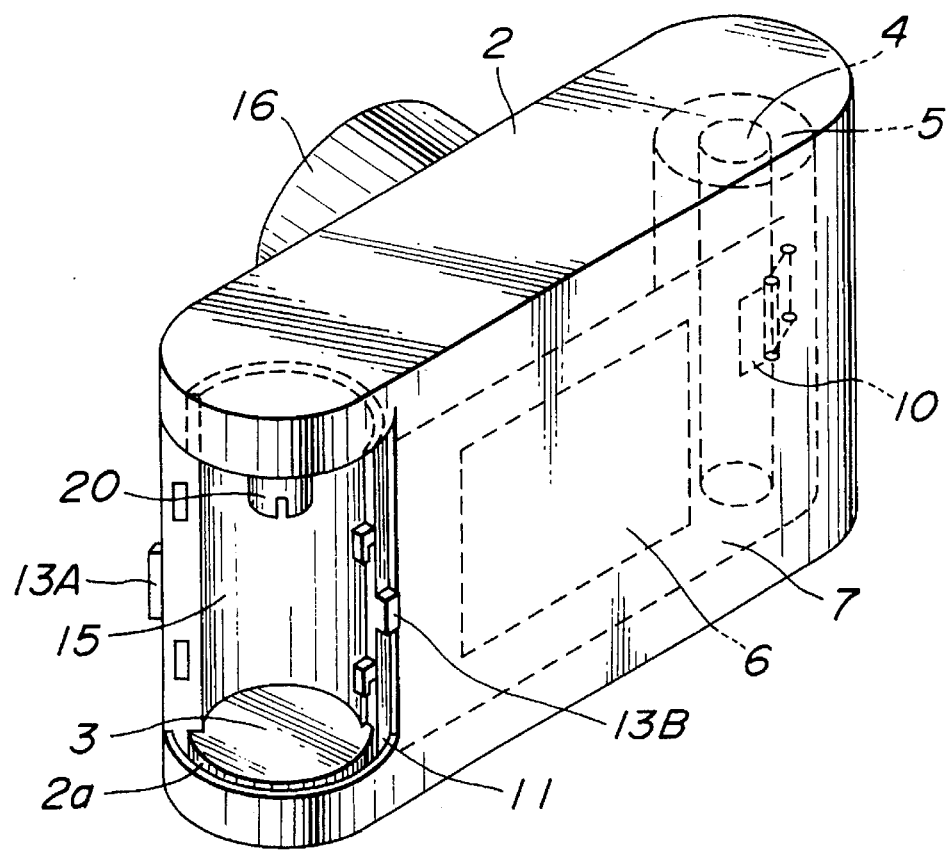
FIG. 1 is a perspective view of a camera according to a first embodiment of the present invention as viewed from the rear side, the view showing a state where an access opening of a cartridge chamber is open.
Figure 3:
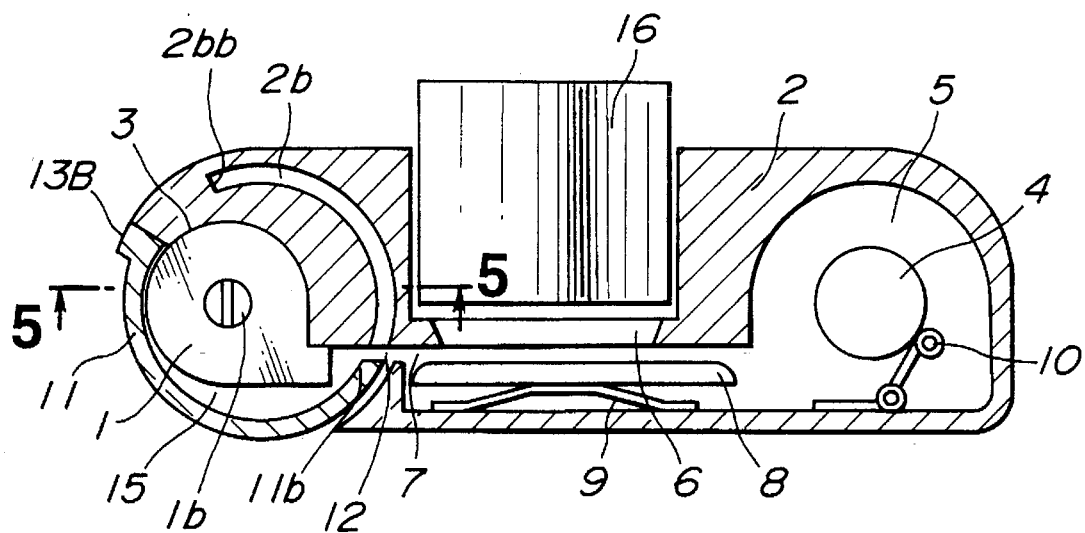
FIG. 3 is a horizontal sectional view centrally of the camera shown FIG. 1.

As shown in FIGS. 1 and 3, the film cartridge 1 is loaded into a cartridge chamber 3 provided in on side of a camera body 2. The cartridge chamber 3 is a cavity substantially in the form of a column. A wall of the camera body 2 defining the cavity is cut away to provide an opening with vertical sides on one side end of the camera and on the rear side of the camera, thereby forming an access opening 15 through which the cartridge chamber 3 is exposed to the exterior. The film cartridge 1 is loaded or unloaded through the access opening 15. A forked portion 20 is rotatably projected toward the interior of the cartridge chamber 3 from a ceiling wall of the cartridge chamber 3 nearly at the center. The forked portion 20 is engageable with the cartridge shaft 1b of the film cartridge 1. When a motor (not shown) disposed inside the camera body 2 is rotated forward or backward, the forked portion 20 and hence the cartridge shaft 1b are also rotated so that the film 1a stored in the film cartridge 1 is fed to an aperture and a spool shaft 4 in a spool chamber 5 (described later), or the exposed film 1a rolled up around the spool shaft 4 is rewound into the film cartridge 1. Further, a vertically elongated slit 12 is defined in an inner peripheral wall of the cartridge chamber 3 on the side near the aperture 6, allowing the film 1a to be fed to a film feed passage 7 after passing through the slit.

The spool chamber 5 is provided in a side of the camera opposite to the side containing the cartridge chamber 3. The aperture 6 which is defined as an exposure opening for photographing at the center of the camera body 2 is positioned between chambers 3 and 5. In the spool chamber 5, the spool shaft 4 is rotatably supported to extend centrally of the chamber for rolling up the film 1a fed out of the film cartridge 1 which is loaded in the cartridge chamber 3. To ensure smooth rolling-up of the film 1a, a spool pressing roller 10 is projected inwardly of a rear wall of the camera body 2 and is arranged to normally press against a peripheral surface of the spool shaft 4.

Additionally, the film feed passage 7 is provided in the camera body 2 on the rear side thereof so as to extend along the aperture 6. A pressing plate 8 for firmly holding the film flat is supported by a leaf spring 9 mounted on an inner surface of the rear wall of the camera body at a position facing the aperture 6 along the film feed passage 7. The spool chamber 5 and the film feed passage 7 are sealed off in a light-tight manner by the rear wall of the camera body 2.

Figure 4:
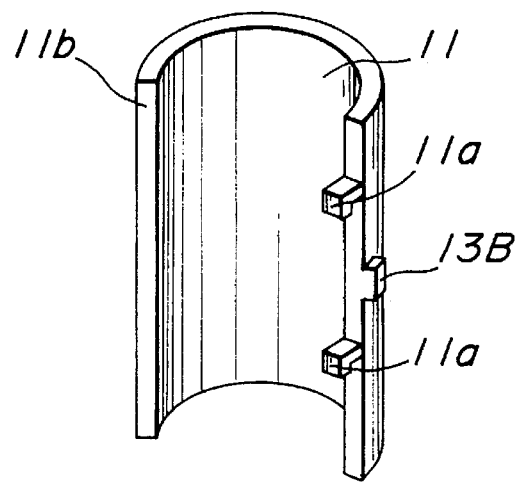
FIG. 4 is a perspective view showing only a slide cover used in the camera of in FIG. 1, but singly extracted therefrom.
Figure 5:
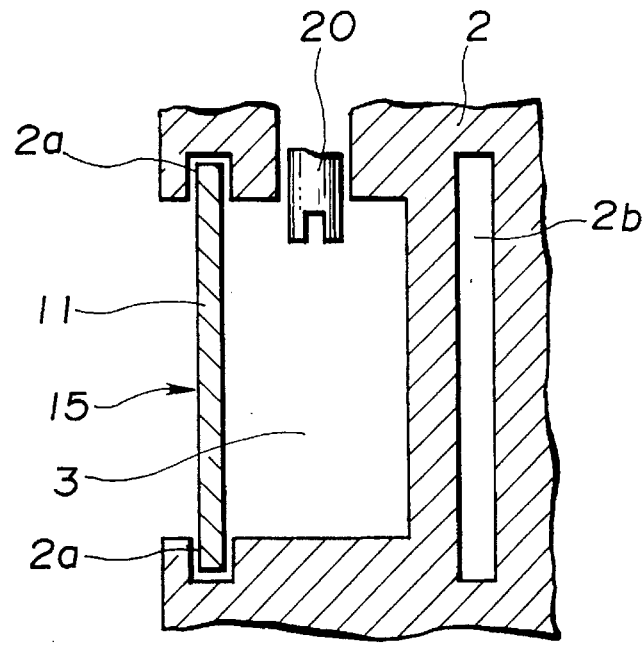
FIG. 5 is an enlarged vertical sectional view of principal parts around the cartridge chamber of the camera of FIG. 1, the view being taken along line 5—5 in FIG. 3.

On the other hand, as shown in FIGS. 3 to 5, there is provided opening/closing means capable of selectively closing the access opening 15 for the cartridge chamber 3. The opening/closing means for the access opening of the cartridge chamber is a semicylindrical slide cover 11 which can slide along an arc-shaped path so that the access opening 15 is selectively opened or closed. More specifically, arc-shaped guide grooves 2a are formed respectively in upper and lower walls of the camera body 2 around the access opening 15 for the cartridge chamber 3, and upper and lower ends of the slide cover 11 are fitted in the respective grooves 2a in a light-tight manner. Further, inside the camera body 2 in a position opposite to the access opening 15, a storage space 2b which is one form of a receiving slot for receiving the slide cover 16 is provided. Storage space 15 is an arc-shaped cavity which extends between the upper and lower guide grooves 2a and has the same radius as the guide grooves 2a.

To move the slide cover 11 to the position where the access opening 15 is open for loading or unloading the film cartridge 1 into or from the cartridge chamber 3, a locking knob 13A (see FIG. 1) provided on the camera body 2 is operated to disengage hooks 11a, which are provided on an outer end face of the slide cover 11 at vertically spaced positions as shown in FIG. 4, from engagement members (not shown) arranged in openings 2e in the camera body 2. Then, a boss 13B projecting from the outer end face of the slide cover 11 at the center thereof is moved in the counterclockwise direction in FIG. 3. This allows the slide cover 11 to slide along the arc-shaped guide grooves 2a and move into the storage space 2b provided inside the camera body 2. As a result, the access opening 15 for the cartridge chamber 3 opened.

The storage space 2b and the boss 13B which also act as stoppers for limiting movement of the slide cover 11 in the counterclock direction, cooperatively constitute restriction means for, restricting the movement of the slide cover 11.

Specifically, for example, at the position where the slide cover 11 is turned to fully open the access opening 15, the boss 13B as the stopper abuts against an end of a wall at the rear of the camera to thereby restrict the movement of the slide cover 11.

As an alternative, the movement of the slide cover 11 is restricted when a leading end 11b of the slide cover 11 abuts against a wall 2bb of the storage space 2b receiving the slide cover 11.

Incidentally, a lens barrel is denoted by numeral 16 in the drawings.

The operation of opening for closing the access opening 15 for the cartridge chamber in the thus-constructed camera of the first embodiment will be described below in detail with reference to FIGS. 6 and 7.

Figure 6:
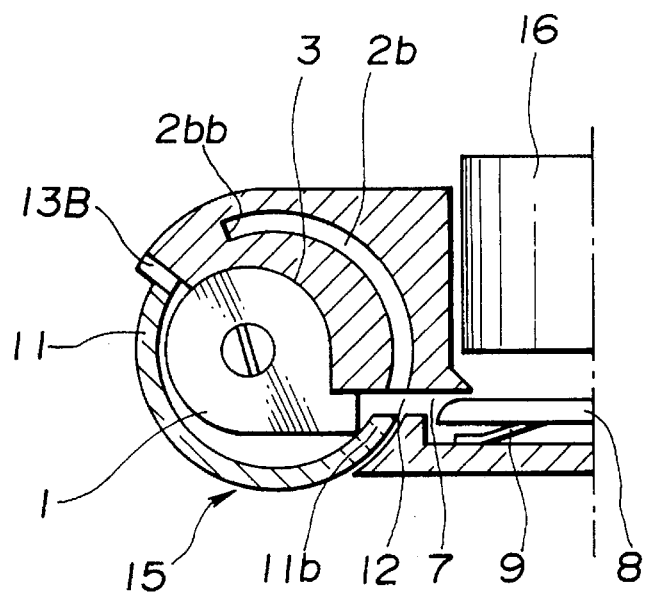
FIG. 6 is an enlarged horizontal sectional view of principal parts around the cartridge chamber of the camera of FIG. 1, the view showing a state where the access opening of the cartridge chamber is closed by the slide cover.

FIG. 6 shows a state where the film cartridge 1 is loaded in the cartridge chamber 3 and the access opening 15 for the cartridge chamber 3 is closed by the slide cover 11. In this state, the slit 12 defined in part of the inner peripheral wall of the cartridge chamber 3 to be communicated with the film feed passage 7 is open to establish (i.e. provide an unblocked passageway) between the cartridge chamber 3 and the film feed passage 7. Therefore, by energizing the motor (not shown) disposed inside the camera body 2 to rotate so that the forked portion 20 and hence the cartridge shaft 1b engaging the forked portion 20 are rotated in the counterclockwise direction, the film 1a in the film cartridge 1 is fed out of the film cartridge 1 and then rolled up around the spool shaft 4 in the spool chamber 5 after passing the slit 12 and the film feed passage 7.

Figure 7:
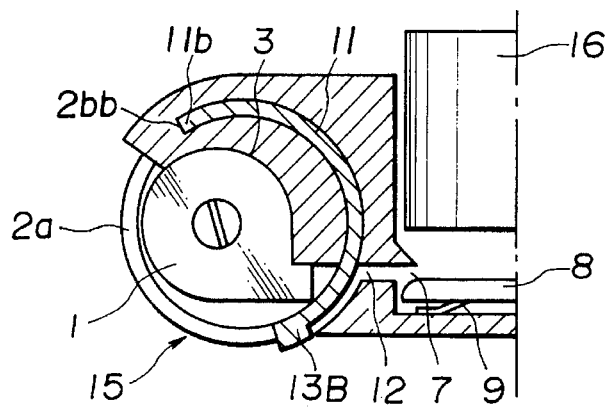
FIG. 7 is an enlarged horizontal sectional view of principal parts around the cartridge chamber of the camera of FIG. 1, the view showing a state where the slide cover is positioned to open the cartridge chamber.

FIG. 7 shows a state where the slide cover 11 of the cartridge chamber 3 is slid to the position exposing the access opening 15 for the cartridge chamber 3 for taking out the film cartridge 1 loaded in the cartridge chamber 3. Thus, the slide cover 11 along the arc-shaped guide grooves 2a and moves into the storage space 2b provided inside the camera beady 2. In the state where the slide cover 11 is fully received in the storage space 2b, the boss 13B on the slide cover 11 abuts against an end of the rear wall of the camera, and the slit 12 communicating with the film feed passage 7 is blocked by part of the slide cover 11. In other words, when the slide cover 11 as the opening/closing means for the access opening of the cartridge chamber is moved to the position where the access opening 15 for the cartridge chamber 3 is exposed the slit 12 communicating the cartridge chamber 3 and the film feed passage 7 with each other is blocked. As a result, dust or the like can be prevented from entering the film feed passage 7 and the spool chamber 5.

Figure 8:
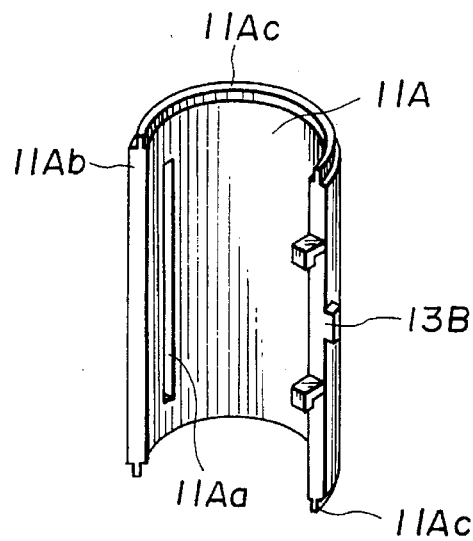
FIG. 8 is a perspective view of a slide cover for use in a camera according to a second embodiment of the present invention.
Figure 9:
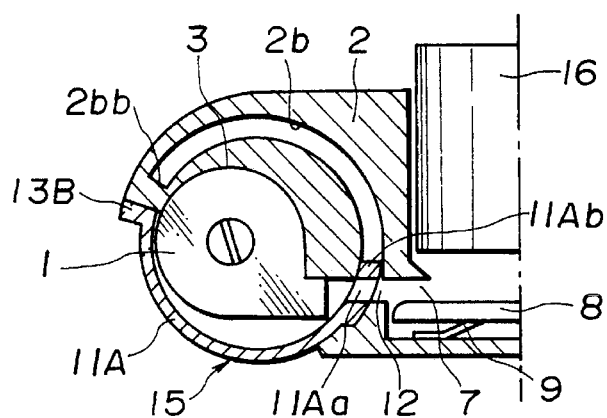
FIG. 9 is an enlarged horizontal sectional view of principal parts around the cartridge chamber of the camera in which the slide cover of FIG. 8 is employed, the view showing a state where the access opening of the cartridge chamber is closed by the slide cover.
Figure 10:
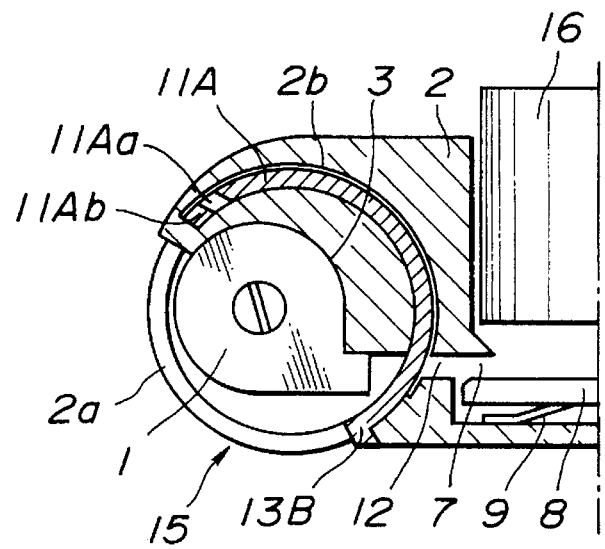
FIG. 10 is an enlarged horizontal sectional view of principal parts around the cartridge chamber of the camera in which the slide cover of FIG. 8 is employed, the view showing a state where the slide cover is positioned to open the cartridge chamber.

FIGS. 8 to 10 show a second embodiment of the present invention.

In a camera according to the second embodiment, the slide cover 11 of the cartridge chamber in the camera of the above first embodiment is partly modified in shape, while other components have the same structure as in the camera of the first embodiment described above. To avoid a repetitive description, therefore, the identical components are here dens, ted by the same reference numerals instead of describing them again, and only the different components will be described below.

In the camera of the second embodiment, a slide cover 11A as shown in FIG. 8 is employed as the opening/closing means for the access opening of the cartridge chamber. The slide cover 11A has an arcuate (i.e. semicylindrical) form as with the first embodiment, and has ridges 11Ac, 11Ac provided respectively on upper and lower end faces and slidably engaged in the respective arc-shaped guide grooves 2a which are formed in upper and lower ends of the camera body 2. The slide cover 11A also has an opening 11Aa defined in a position near its inner end 11Ab. Opening 11Aa is a vertically aligned elongated through hole. As shown in FIG. 9, the opening 11Aa is aligned with the aforesaid slit 12 when the slide cover 11A is positioned to close the access opening 15. The slide cover 11A constructed as described above is disposed along the outer circumference of the cartridge chamber 3 in the camera body 2 to selectively open or close the access opening 15 for the cartridge chamber 3 as shown in FIGS. 9 and 10.

The camera of the second embodiment constructed as described above operates as follows.

FIG. 9 shows a state where the film cartridge 1 loaded in the cartridge chamber 3 in the camera body 2 and the access opening 15 for the cartridge chamber 3 is closed by the slide cover 11A. In the state of FIG. 9, i.e., when the slide cover 11A is positioned to close the access opening 15 for the cartridge chamber 3, the elongated opening 11Aa in slide cover 11A is aligned with the slit 12 formed in the inner peripheral wall of the cartridge chamber 3, allowing the film 1a (see FIG. 2) to pass through the slit 12. Therefore, by energizing the motor (not shown) disposed inside the camera body 2 to rotate so that the forked portion 20 (see FIG. 1) extending downward from the ceiling wall of the cartridge chamber 3 is rotated in the counterclockwise direction, the film 1a in the film cartridge 1 is fed out of the film cartridge 1 and then rolled up around the spool shaft 4 in the spool chamber 5 after passing through the opening 11Aa, the slit 12 and the film feed passage 7.

In the second embodiment, when the slide cover 11A is moved to completely close the access opening 15 for the cartridge chamber 3, the entry end of the storage space 2b is blocked by the inner end 11Ab of the slide cover 11A so that the film 1a fed out of the film cartridge 1 is prevented from erroneously (i.e. accidentally) entering the storage space 2b provided inside the camera body 2.

FIG. 10 shows a state where the slide cover 11A is turned to move into the camera body 2 and is fully received in the storage space 2b so that the access opening 15 for the cartridge chamber 3 is open, for unloading or loading the film cartridge 1 from or into the cartridge chamber 3.

In this state, as with the above first embodiment, the boss 13B, doubling as a stopper, on the slide cover 11A abuts against an end of the rear wall of the camera to restrict the movement of the slide cover 11A. Simultaneously, the slit 12 formed in the inner peripheral wall of the cartridge chamber 3 to be communicated with the film feed passage 7 is blocked by the slide cover 11A. Therefore, the film feed passage 7 and the spool chamber 5 are shielded when the cartridge chamber 3 is open, i.e., the film feed passage 7 and spool chamber 5 are shielded from the exterior of the camera.

As a result, when the slide cover 11A is positioned to open access opening 15 for the cartridge chamber 3 dust or the like can be prevented from entering the film feed passage 7 and the spool chamber 5.

Figure 11:
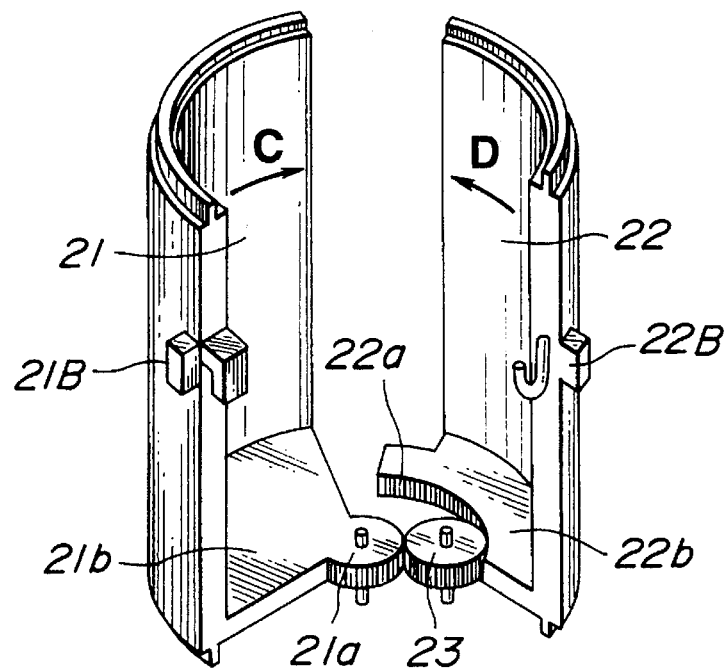
FIG. 11 is a perspective view of a slide cover for use in a camera according to a third embodiment of the present invention.
Figure 12:
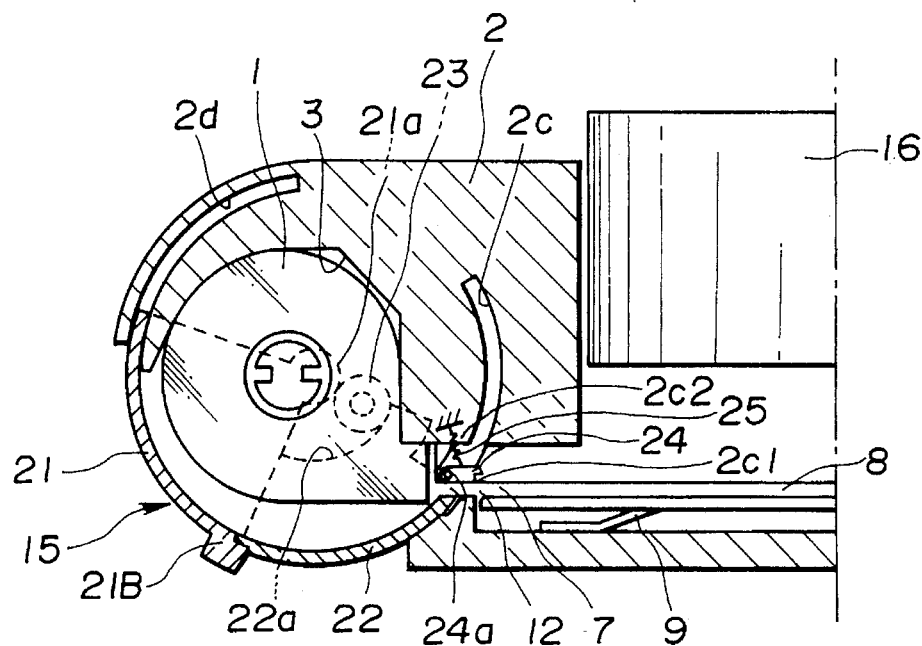
FIG. 12 is an enlarged horizontal sectional view of principal parts around the cartridge chamber of the camera in which the slide cover of FIG. 11 is employed, the view showing a state where the access opening of the cartridge chamber is closed by the slide cover.
Figure 13:
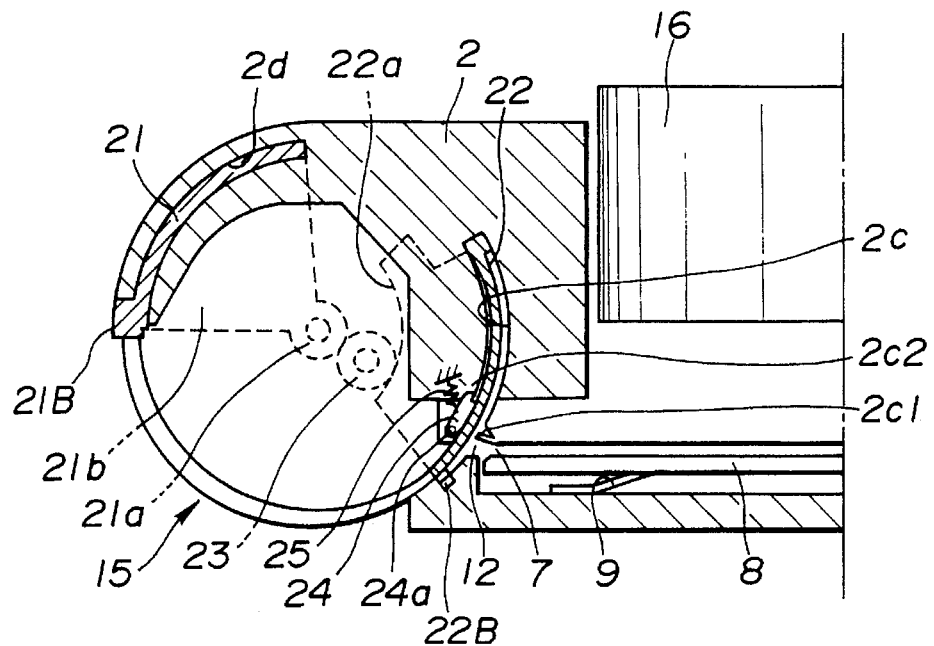
FIG. 13 is an enlarged horizontal sectional view of principal parts around the cartridge chamber of the camera in which the slide cover of FIG. 11 is employed, the view showing a state where the slide cover positioned to open the cartridge chamber.

FIGS. 11 to 13 show a third embodiment of the present invention. For a camera of this third embodiment, the identical components to those in the camera of the above embodiment are here denoted by the same reference numerals instead of describing them again, and only components which are different from the previous embodiments will be described below.

The opening/closing means for the access opening of the cartridge chamber in this third embodiment comprises two slide covers 21, 22 which can be turned in opposite directions to open or close the access opening 15. More specifically, as shown in FIG. 11, the slide covers 21, 22 are each substantially in the form of half of a semicylinder, each being a quarter-circle arcuate section. A driving mechanism for opening or closing the slide covers 21, 22 is disposed under a bottom wall of the cartridge chamber 3. The driving mechanism comprises a gear 21a which is formed integrally with a sector-shaped bottom wall 21b extending from a lower end of one slide cover 21 toward the center of the arcuate section and has its axis aligned with the center of the arcuate section, an idle gear 23 held in mesh with the gear 21a, and an internal gear 22a which is formed in an inner arc-shaped surface of a bottom wall 22b in the form of a truncated sector extending from a lower end of the other slide cover 22 toward the above-mentioned center and is held in mesh with the idle gear 23. Central shafts of the gear 21a and the idle gear 23 are rotatably supported by the bottom wall of the cartridge chamber 3.

The internal gear 22a has female teeth formed about the axis of the gear 21a on the slide cover 21. When the slide cover 21 is moved in the clockwise direction (indicated by the arrow C) in FIG. 11, the idle gear 23 is rotated in the counterclockwise direction, and hence the slide cover 22 is turned to slide in the counterclockwise direction (indicated by the arrow D). On the other hand, when the slide cover 21 is turned to slide in the counterclockwise direction in FIG. 11, the slide cover 22 is turned to slide in the clockwise direction.

In this third embodiment, corresponding to the slide cover being split in to two parts as described above, the storage space as one form of the receiving slot defined inside the camera body 2 comprises a storage space 2d in which one slide cover 21 is received, and a storage space 2e in which the other slide cover 22 is received (see FIG. 12).

The slide covers 21, 22 respectively have bosses 21B, 22B doubling as stoppers and provided at the centers of their respective outer end faces. The bosses 21B, 22B and the storage spaces 2d, 2c cooperatively constitute restriction means for restricting further movement of the slide covers 21, 22 when the covers are turned to the positions where the access opening 15 is fully open.

Further, as shown in FIG. 12, there is provided an openable/closable gate 24 as one form of a openable/closable lid for opening or closing the entry of the storage space 2e to receive the slide cover 22. The openable/closable gate 24 is pivotable about a shaft 24a supported by the camera body 2, and is normally urged by a spring 25 under compression to move away from the camera body 2 so as to close the entry of the storage space 2c when the access opening 15 is closed. The movement of the openable/closable gate 24 due to the urging of the spring 25 is restricted by a stopper 2c1 provided to one side of the slit 12 to rest at a position where it fully blocks the storage space 2c. In other words, when the slide covers 21, 22 are positioned to close the access opening 15 for the cartridge chamber 3, the openable/closable gate 24 is closed to block the entry of the storage space 2c to prevent the tip end of the film 1a fed out of the film cartridge 1 from erroneously entering the storage space 2c. When the access opening 15 is opened, the openable/closable gate 24 is pushed back by the slide cover 22 and is retracted into a recess 2c2 for receiving the openable/closable gate 24.

The camera of the third embodiment constructed as described above operates as follows.

FIG. 12 shows a state where the film cartridge 1 is loaded in the cartridge chamber 3 and the access opening 15 for the cartridge chamber 3 is closed by the slide covers 21, 22 in the third embodiment. This state is reached by turning the slide cover 21 in the storage space 2d to slide in the counterclockwise direction as described above. Thus, by turning the slide cover 21 in this manner, the slide cover 22 in the storage space 2c is simultaneously turned to slide in the clockwise direction, whereby both the slide covers 21, 22 are finally engage one another to close the access opening 15 the cartridge chamber 3.

At this time, the slit 12 communicating the cartridge chamber 3 and the film feed passage 7 with each other is open. Therefore, by energizing the motor (not shown ) disposed posed inside the camera body 2 to rotate so that the forked portion 20 (see FIG. 1) and the cartridge shaft 1b of the film cartridge 1 engaging the forked portion 20 are rotated in the counterclockwise direction, the film 1a in the film cartridge 1, which is loaded in the cartridge chamber 3, is fed out of the film cartridge 1 toward the spool chamber.

Also, in the closed state, the openable/closable gate 24 is pivoted about the support shaft 24a under resiliency of the spring 25 to block the entry of the storage space 2c. Accordingly, the tip end of the film 1a fed out of the film cartridge 1 is prevented from erroneously entering the storage space 2c.

FIG. 13 shows a state where the access opening 15 for the cartridge chamber 3 is made open for unloading or loading the film cartridge 1 from or into the cartridge chamber 3. This state is reached by moving the slide cover 21 in the above closed state shown in FIG. 12 in the clockwise direction. The slide cover 21 rotates the gear 21a on the bottom wall of the slide cover 21 which turns the internal gear 22a on the bottom wall of the slide cover 22 and hence the slide cover 22 in the counterclockwise direction through the idle gear 23 held in mesh with gears 21a, 22a. Therefore, the slide covers 21, 22 are simultaneously received into the storage spaces 2d, 2c and the bosses 21B, 22B on the slide covers 21, 22 are finally abutted against respective ends of and the rear wall of the camera, thereby restricting the movement of the slide covers 21, 22.

At this time, because the force applied by the slide cover 22 moving into the storage space 2c while pressing the openable/closable gate 24 is greater than the resilient force of the spring 25 urging the openable/closable gate 24 toward the entry of the storage space 2c, the openable/closable gate 24 is retracted into the openable/closable gate receiving recess 2c2 formed in one side wall of the storage space 24 so that it will not block the storage space 2c. Accordingly, the slide cover 22 can be smoothly received into the storage space 2c without suffering any obstruction from the openable/closable gate 24 resiliently urged by spring 25 to close the entry of the storage space 2c.

When the slide cover 22 is received in the storage space 2c, it blocks the slit 12 from communicating the cartridge chamber 3 and the film feed passage 7 with one another. As a result, when the slide covers 21, 22 are moved to open the access opening 15 for the cartridge chamber 3 dust or the like can be prevented from entering the film feed passage 7 and the spool chamber 5.

What is claimed is:

1. A camera using a film cartridge of film feeding type, comprising:
   a cartridge chamber having an access opening through which said film cartridge is loaded into said cartridge chamber in a direction transverse to a cartridge shaft of said film cartridge'
   a slide cover capable of turning to an open position where said film cartridge is loaded and a closed position where said access opening is closed; and
   restriction means for restricting a turning position of said slide cover so that a path between said cartridge chamber and a film feed passage is blocked by part of said slide cover, when said slide cover is turned to the open position.

2. A camera according to claim 1, wherein a receiving slot is formed in a camera body for slidably receiving at least part of said slide cover when said slide cover is turned to open position.

3. A camera according to claim 2, wherein said restriction means comprises a stopper formed in one of said receiving slot and said camera body.

4. A camera according to claim 2, wherein said receiving slot has an entry which is open to both said cartridge chamber and said film feed passage, and an openable/closable lid is provided at an end of said receiving slot where said receiving slot is open to said cartridge chamber and said film feed passage, and wherein said openable/closable lid is urged by resilient means toward the receiving slot entry to close said receiving slot when a film is fed.

5. A camera according to claim 4, wherein when said slide cover is turned from the closed position to the open position, said openable/closable lid is moved by the slide cover to an open position against the urging force of the resilient means when said slide cover is moved into said receiving slot.

6. A camera according to claim 1, wherein said slide cover comprises a first member capable of selectively turning in one of a clockwise and counter-clockwise direction which blocks a path between said cartridge chamber and said film feed passage, and a second member capable of selectively turning in one of a clockwise and counterclockwise direction and means coupled between the first and second members which turns said second member in a direction opposite a direction which said first member turns.

7. A camera according to claim 6, wherein said coupling means turns first and second members in an interlocking relationship.

8. A camera according to claim 7, wherein the coupling means comprises a gear meshing with gear portions provided on said first and second members.

9. A camera using a film cartridge of film feeding type, comprising:
   a cartridge chamber having an access opening through which said film cartridge is loaded into said cartridge chamber in a direction transverse to a cartridge shaft of said film cartridge;
   opening/closing means comprised of at least one movable member for selectively opening and closing the access opening of said cartridge chamber, whereby said at least one movable member blocks a path between said cartridge chamber and a film feed passage at least when said opening/closing means is moved to a position where said access opening is open; and
   restriction means for restricting the opening/closing means from moving beyond positions respectively associated with the open and closed conditions of the access opening, where the movement of said opening/closing means is terminated when said opening/closing means is moved to selectively open and close the access opening of said cartridge chamber.

10. A camera according to claim 9, wherein said movable member has a first portion thereof for blocking said path and an adjacent portion integral with said first portion for at least partially covering the access opening.

11. A camera according to claim 10, wherein said movable member slides along curved guides provided in said camera.

12. A camera using a film cartridge of film feeding type, comprising:
   a cartridge chamber having an access opening through which said film cartridge is loaded into said cartridge chamber in a direction transverse to a cartridge shaft of said film cartridge;
   opening/closing means comprised of at least one movable member for selectively opening and closing the access opening of said cartridge chamber, whereby said opening/closing means blocks a path between said cartridge chamber and a film feed passage at least when said opening/closing means is moved to a position where said access opening is open;
   restriction means for restricting the opening/closing means from moving beyond positions respectively associated with the open and closed conditions of the access opening, where the movement of said opening/closing means is terminated when said opening/closing means is moved to selectively open and close the access opening Of said cartridge chamber; and
   a receiving slot is formed in a camera body for slidably receiving at least part of said opening/closing means when said opening/closing means is moved to an open position.

13. A camera according to claim 12, wherein said receiving slot has an entry open to both said cartridge chamber and said film feed passage, an openable/closable lid being provided at an end of said receiving slot where said receiving slot entry is open to said cartridge chamber and said film feed passage, and wherein said openable/closable lid is urged by resilient means toward the receiving slot entry to close said receiving slot when a film is fed.

14. A camera according to claim 13, wherein when said opening/closing means is moved from a closed position to an open position, said openable/closable lid is moved to an open position against an urging force of the resilient means applied to close the same upon said opening/closing means being moved into said receiving slot.

15. A camera according to claim 12, wherein said opening/closing means has an opening which allows the film to pass therethrough when said opening/closing means is moved to the position where said cartridge chamber is closed.

16. A camera according to claim 12, wherein said opening/closing means comprises a first curved member which can turn in one of a clockwise and counterclockwise direction which blocks a path between said cartridge chamber and said film feed passage, and a second curved member which can turn in one of a clockwise and counterclockwise direction, and includes means responsive to turning of the first curved member for turning in a direction opposite a direction in which said first curved member turns.

17. A camera according to claim 16, wherein said first and second curved members are turned in an interlocking relationship by a coupling means.

18. A camera according to claim 17 wherein gear means in meshing engagement with gears respectively integral with said first and second curved members provide said interlocking relationship to move said semi-cylindrical members.

19. A camera comprising:

a cartridge receiving chamber in one side of the camera for receiving a film cartridge;

a film rolling-up chamber disposed on a side of camera opposite to said cartridge receiving chamber with an aperture for photographing arranged therebetween;

a film feed passage formed between said cartridge receiving chamber and said film rolling-up chamber to extend along said aperture for photographing;

a film cartridge loading opening formed in a portion of said camera corresponding to said cartridge receiving chamber enabling loading of a film cartridge into said cartridge receiving chamber therethrough; and a cover for selectively opening and closing said film cartridge loading opening, at least part of said cover blocking a path between said film feed passage and said cartridge receiving chamber in a state where said film cartridge loading opening is open.

20. A camera according to claim 19, wherein said film cartridge loading opening at least partially faces a rear side of said camera.

21. A camera according to claim 19, wherein said cover is a slide cover.

22. A camera according to claim 21, wherein said cover is a curved slide cover which is slidable along an arc-shaped path to open or close said film cartridge loading opening.

23. A camera using a film cartridge of film feeding type, comprising:

a cartridge chamber having an access opening through which said film cartridge is loaded into said cartridge chamber;

a slide cover capable of turning to an open position where said film cartridge is loaded and a closed position where said access opening is closed; and restriction means for restricting a turning position of said slide cover so that a path between the said cartridge chamber and a film feed passage is blocked by part of said slide cover, when said slide cover is turned to the open position.

24. A camera according to claim 23, further comprising a driving member at one end of said chamber, said film cartridge being arranged in said cartridge chamber so that a cartridge shaft of said film cartridge and said driving member are coaxially aligned.

* * * * *